US012053993B2

(12) United States Patent
Sato et al.

(10) Patent No.: US 12,053,993 B2
(45) Date of Patent: Aug. 6, 2024

(54) TRANSPORT DEVICE AND RECORDING DEVICE

(71) Applicant: Seiko Epson Corporation, Tokyo (JP)

(72) Inventors: Koji Sato, Shiojiri (JP); Yoshihisa Horikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 203 days.

(21) Appl. No.: 17/558,743

(22) Filed: Dec. 22, 2021

(65) Prior Publication Data

US 2022/0203732 A1   Jun. 30, 2022

(30) Foreign Application Priority Data

Dec. 25, 2020   (JP) ................ 2020-216435

(51) Int. Cl.
| | |
|---|---|
| *B41J 29/17* | (2006.01) |
| *B01D 35/02* | (2006.01) |
| *B01D 35/157* | (2006.01) |
| *B08B 3/14* | (2006.01) |
| *B08B 13/00* | (2006.01) |
| *B65G 45/22* | (2006.01) |
| *B65G 45/26* | (2006.01) |
| *B65H 5/02* | (2006.01) |
| *B08B 1/12* | (2024.01) |

(Continued)

(52) U.S. Cl.
CPC ............. *B41J 29/17* (2013.01); *B01D 35/02* (2013.01); *B01D 35/157* (2013.01); *B08B 3/14* (2013.01); *B08B 13/00* (2013.01); *B65G 45/22* (2013.01); *B65G 45/26* (2013.01); *B65H 5/021* (2013.01); *B08B 1/12* (2024.01); *B08B 1/165* (2024.01); *B08B 1/32* (2024.01); *B65H 2301/531* (2013.01); *B65H 2402/44* (2013.01)

(58) Field of Classification Search
CPC ........ B65G 45/10; B65G 45/22; B65G 45/26; B65H 5/021; B65H 2301/531; B41F 23/00; B41J 29/17; B01D 35/02; B01D 35/157; B01D 35/1573; B08B 3/04; B08B 3/041; B08B 3/14; B08B 2209/00; B08B 1/02; B08B 1/005; B08B 1/04
USPC ............................ 198/494, 495, 497; 474/92
See application file for complete search history.

(56) References Cited

U.S. PATENT DOCUMENTS

| | | | | |
|---|---|---|---|---|
| 5,751,307 | A | * | 5/1998 | Paroff .................. B41J 2/45 |
| | | | | 134/122 R |
| 7,866,783 | B2 | * | 1/2011 | Tsuji .................. B41J 29/17 |
| | | | | 347/22 |

(Continued)

FOREIGN PATENT DOCUMENTS

| | | |
|---|---|---|
| JP | 2002-296921 | 10/2002 |
| JP | 2009-241285 | 10/2009 |

*Primary Examiner* — Leslie A Nicholson, III
(74) *Attorney, Agent, or Firm* — WORKMAN NYDEGGER

(57) ABSTRACT

A transport device includes a transporting belt having a support face configured to support a medium and configured to transport the medium, a device main body in which the transporting belt is provided, and a cleaning unit configured to clean the support face with a liquid. The cleaning unit includes a storage unit in which the liquid is stored, a flow path member through which the liquid discharged from the storage unit and returned to the storage unit passes, and a filter unit detachably provided to the flow path member. Here, the filter unit is configured to be pulled out in a direction away from the device main body.

6 Claims, 3 Drawing Sheets

(51) Int. Cl.
    *B08B 1/16*           (2024.01)
    *B08B 1/32*           (2024.01)

(56) References Cited

U.S. PATENT DOCUMENTS

| | | | |
|---|---|---|---|
| 7,901,030 B2 * | 3/2011 | Miyata | B65H 5/021 |
| | | | 399/350 |
| 8,985,737 B2 * | 3/2015 | Momose | B41J 29/17 |
| | | | 347/22 |
| 9,061,510 B2 * | 6/2015 | Kobayashi | B01D 35/02 |
| 9,298,138 B2 * | 3/2016 | Ishizuka | B41J 11/007 |
| 10,500,615 B2 * | 12/2019 | Kozuma | B65G 45/18 |
| 10,875,309 B2 * | 12/2020 | Arimura | B41J 2/16508 |
| 11,648,786 B2 * | 5/2023 | Yamaguchi | B41J 29/17 |
| | | | 347/104 |
| 2009/0244247 A1 | 10/2009 | Yamamoto et al. | |
| 2017/0182520 A1 * | 6/2017 | Yamaya | B08B 3/04 |
| 2019/0275799 A1 | 9/2019 | Shimazaki et al. | |
| 2020/0070521 A1 * | 3/2020 | Arimura | B41J 2/16508 |

\* cited by examiner

TRANSPORT DEVICE AND RECORDING DEVICE

The present application is based on, and claims priority from JP Application Serial Number 2020-216435, filed Dec. 25, 2020, the disclosure of which is hereby incorporated by reference herein in its entirety.

BACKGROUND

1. Technical Field

The present disclosure relates to a transport device including a belt capable of transporting a medium, and a recording device including the transport device.

2. Related Art

An example of this type of transport device is described in JP-A-2009-241285. This transport device includes an endless belt 5 configured to transport a recording medium P in a predetermined transport direction while supporting the recording medium P on a surface 5a, a brush roller 7 configured to clean the surface 5a, an ejection cylinder 9 configured to directly eject a cleaning liquid L onto the surface 5a of the endless belt 5 that passes through an ejection region S upstream of the brush roller 7 in the transport direction, a storage device 10 provided below at least the ejection region S and the ejection cylinder 9 and configured to collect and store the dripping cleaning liquid L, and a liquid feeding pump 12 configured to feed the cleaning liquid L stored in the storage device 10 to the ejection cylinder 9.

The cleaning liquid L is filtered by a filter 12c in a process of circulating in a liquid feeding path.

In the transport device described in JP-A-2009-241285, the filter 12c becomes dirty and thus needs to be replaced. However, JP-A-2009-241285 does not explain the replacement of the filter 12c.

SUMMARY

In order to solve the problems described above, a transport device according to the present disclosure includes a transporting belt having a support face configured to support a medium and configured to transport the medium, a device main body in which the transporting belt is provided, and a cleaning unit configured to clean the support face with a liquid, in which the cleaning unit includes a storage unit in which the liquid is stored, a flow path member through which the liquid discharged from the storage unit and returned to the storage unit passes, and a filter unit detachably provided to the flow path member, and the filter unit is configured to be pulled out in a direction away from the device main body.

Further, a recording device according to the present disclosure includes a recording unit configured to perform recording on a medium, a transporting belt having a support face configured to support the medium and configured to transport the medium, a device main body in which the transporting belt is provided, and a cleaning unit configured to clean the support face with a liquid, in which the cleaning unit includes a storage unit in which the liquid is stored, a flow path member through which the liquid discharged from the storage unit and returned to the storage unit passes, and a filter unit detachably provided to the flow path member, and the filter unit is configured to be pulled out in a direction away from the device main body.

DESCRIPTION OF EXEMPLARY EMBODIMENTS

Figure 1:
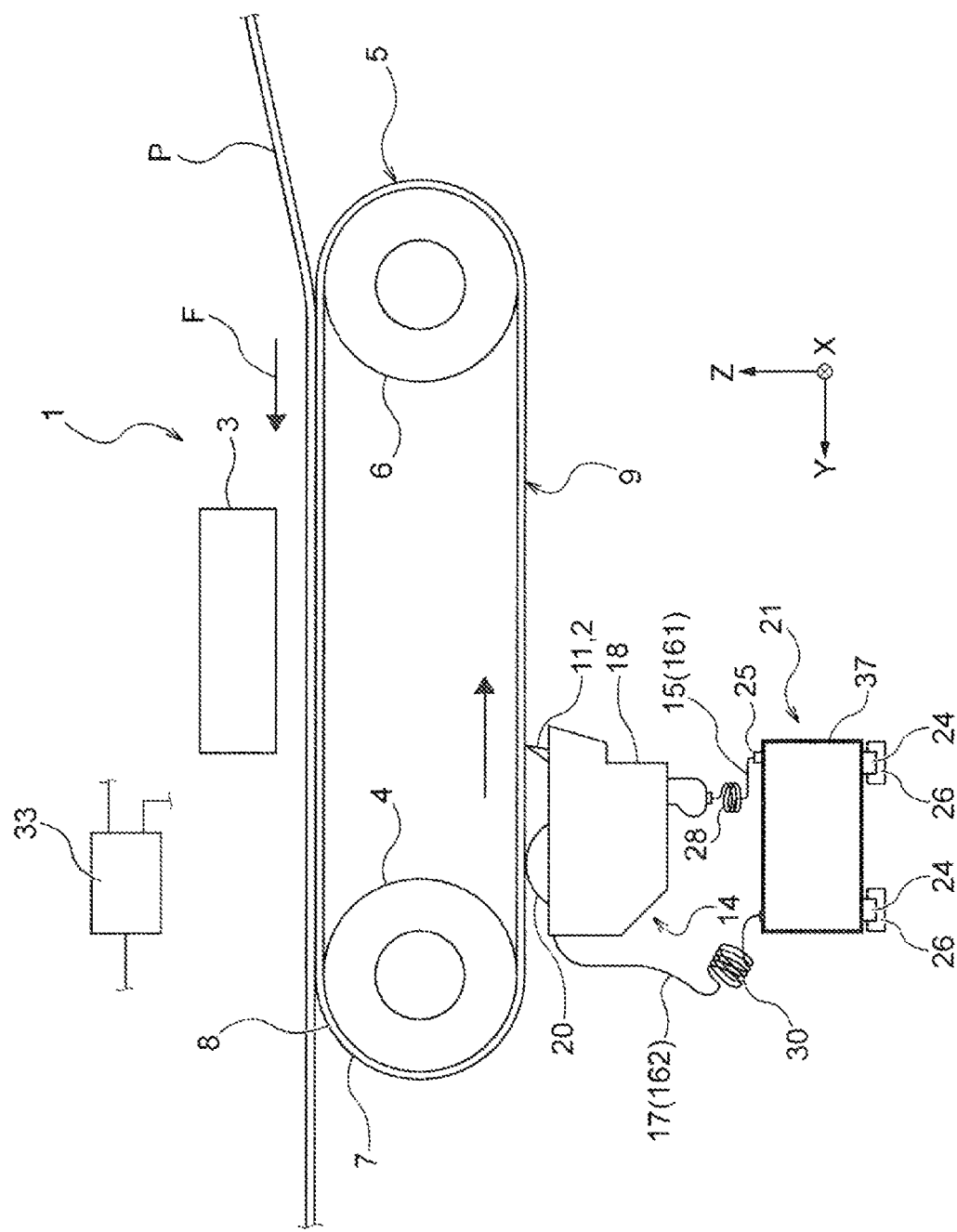
FIG. 1 is a schematic side view of a main part of a recording device including a transport device according to a first exemplary embodiment of the present disclosure.

Hereinafter, the present disclosure will be schematically described first.

In order to solve the problems described above, a first aspect of a transport device according to the present disclosure includes a transporting belt having a support face configured to support a medium and configured to transport the medium, a device main body in which the transporting belt is provided, and a cleaning unit configured to clean the support face with a liquid, in which the cleaning unit includes a storage unit in which the liquid is stored, a flow path member through which the liquid discharged from the storage unit and returned to the storage unit passes, and a filter unit detachably provided to the flow path member, and the filter unit is configured to be pulled out in a direction away from the device main body.

Here, the "device main body" includes a structure in which, for example, a plurality of frames are combined.

According to this aspect, the filter unit can be pulled out in the direction away from the device main body. As a result, by pulling out the filter unit in the direction away from the device main body, it is possible to move a filter to a position where it is easy to remove the filter from the filter unit. Thus, the workability of replacing the filter by the user can be improved.

In the first aspect, the transport device according to a second aspect of the present disclosure includes a pump configured to cause the liquid to flow to the storage unit, the filter unit, and the storage unit again, through the flow path member.

According to this aspect, the pump discharges the liquid from the storage unit, and resupplies the liquid after filtered by the filter unit to the storage unit. This allows the liquid to be reused.

In the second aspect, the transport device according to a third aspect of the present disclosure includes a valve configured to switch between a first state in which flow of the liquid is permitted and a second state in which the flow of the liquid is restricted, the pump located downstream of the valve in a flow direction of the liquid and being at least one pump, and a control unit configured to control the valve and the pump, in which the control unit, when the filter unit is pulled out from the device main body, switches the valve from the first state to the second state and then stops operating the pump.

When the filter unit is pulled out from the device main body and the filter is removed from the flow path member, the liquid flowing through the flow path member may leak out.

According to this aspect, when the control unit determines that the filter unit has been pulled out from the device main body, the control unit switches the valve from the first state of flow allowance to the second state of flow restriction, and then stops operating the pump. Thus, the liquid is first restricted from flowing through the flow path member by the valve, and then stops operating the pump located downstream of the valve. Thereby, the liquid remaining in the flow path member can be removed, that is, the liquid can be drained.

In the third aspect, the transport device according to a fourth aspect of the present disclosure includes an accommodating unit configured to accommodate the filter.

According to this aspect, the filter is accommodated in the accommodating unit. Thereby, the filter can be protected from external forces.

In the transport device according to a fifth aspect of the present disclosure, the accommodating unit in the fourth aspect accommodates the valve and the pump.

According to this aspect, the valve and the pump are accommodated in the accommodating unit together with the filter. By collecting the filter unit, the valve, and the pump in one place in this way, maintenance is easy.

In the fourth aspect or the fifth aspect, the transport device according to a sixth aspect of the present disclosure includes an irradiation unit configured to emit light inside the accommodating unit.

According to this aspect, visibility when removing the filter is improved.

The transport device according to a seventh aspect of the present disclosure includes, in any one of the first to sixth aspects, a receiving unit configured to receive the liquid from a coupling portion between the flow path member and the filter unit.

According to this aspect, the transport device includes the receiving unit capable of receiving the liquid from the coupling portion between the flow path member and the filter unit. As a result, when the filter is removed from the flow path member, the liquid that may leak from the coupling portion is received by the receiving unit, so that it is possible to suppress that the surroundings become dirty.

A recording device according to an eighth aspect of the present disclosure includes a recording unit configured to perform recording on a medium, a transporting belt having a support face configured to support the medium and configured to transport the medium, a device main body in which the transporting belt is provided, and a cleaning unit configured to clean the support face with a liquid, in which the cleaning unit includes a storage unit in which the liquid is stored, a flow path member through which the liquid discharged from the storage unit and returned to the storage unit passes, and a filter unit detachably provided to the flow path member, and the filter unit is configured to be pulled out in a direction away from the device main body.

According to this aspect, the same effects as those of the first aspect can be obtained as the recording device including the recording unit capable of performing recording on the medium and the transport device.

First Exemplary Embodiment

Hereinafter, a recording device including a transport device according to a first exemplary embodiment of the present disclosure will be described in detail with reference to FIGS. 1 to 3.

In the following description, the three axes orthogonal to each other are the X-axis, the Y-axis, and the Z-axis, respectively, as illustrated in the figures. The Z-axis direction corresponds to the vertical direction (the direction in which gravity acts). The X-axis direction and the Y-axis direction correspond to the horizontal direction. Here, the Y-axis direction corresponds to a medium transport direction, and the X-axis direction corresponds to a width direction of the medium intersecting the transport direction.

As illustrated in FIG. 1, a recording device 1 according to this embodiment is an ink jet printer, and includes a recording unit 3 including an ejecting head for ejecting ink onto a medium P transported in a transport direction (Y-axis direction) F, and a transport device 5 for transporting the medium P.

Figure 2:
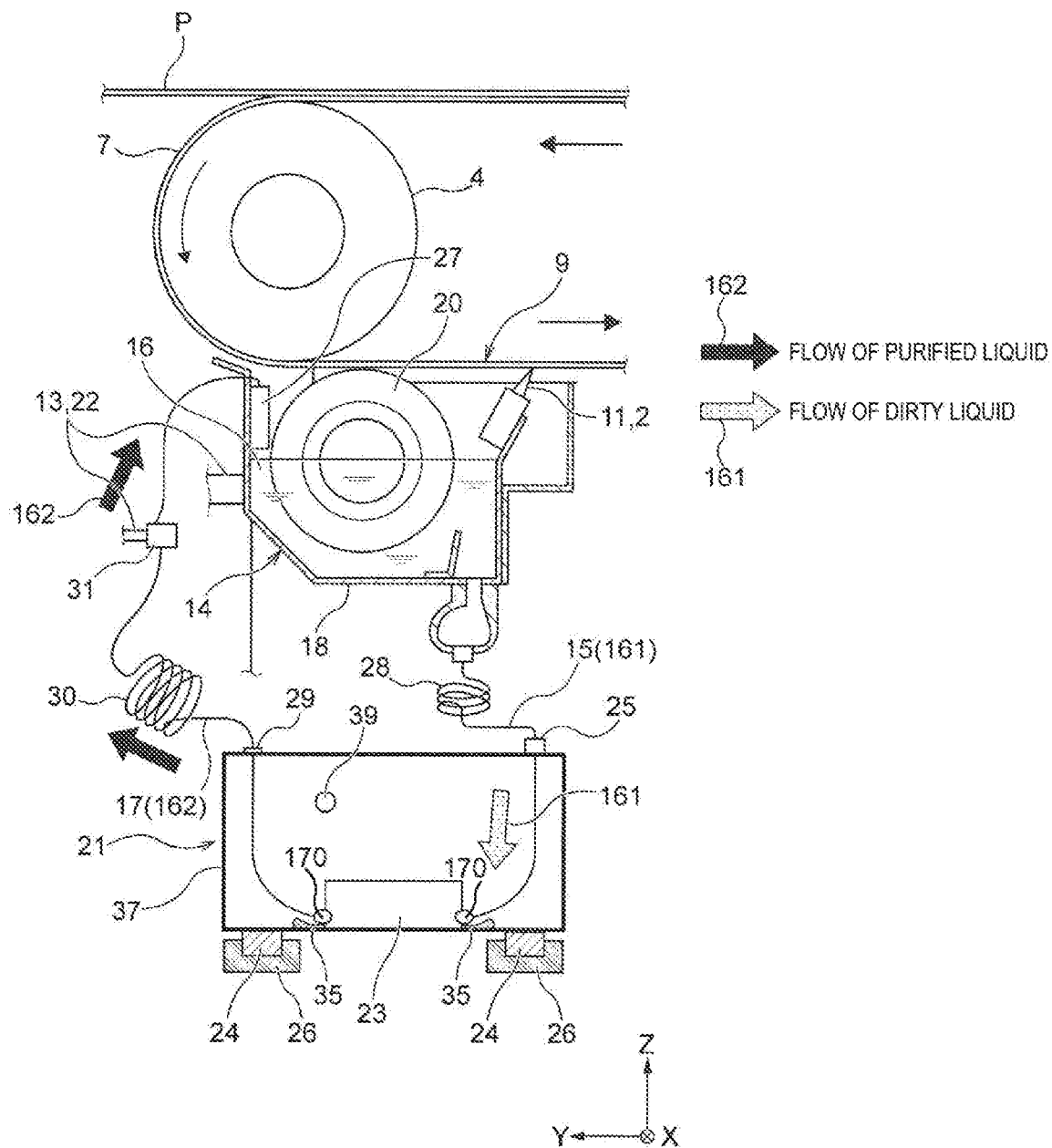
FIG. 2 is an enlarged cross-sectional view of a main part of a cleaning unit according to the first exemplary embodiment as viewed from the X-axis direction.

As illustrated in FIGS. 1 and 2, the transport device 5 of this embodiment includes a transporting belt 9 that has a support face 7 capable of supporting the medium P and is capable of transporting the medium P, a device main body 13 (refer to FIG. 2) in which the transporting belt 9 is provided, and a cleaning unit 14 that cleans the support face 7 with a liquid 16.

The cleaning unit 14 includes a storage unit 18 in which the liquid 16 is stored, flow path members 15 and 17 through which the liquid 16 discharged from the storage unit and returned to the storage unit 18 passes, and a filter unit 21 detachably provided to the flow path members 15 and 17. Here, the filter unit 21 is configured to be able to be pulled out in a direction away from the device main body 13.

Components of the transport device 5 will be described below.

Transporting Belt

As illustrated in FIG. 1, the transporting belt 9 is an endless belt that is stretched between a drive roller 4 and a driven roller 6. An adhesive layer 8 is provided on the support face 7 serving as the outer peripheral surface of the endless transporting belt 9. The medium P is attached to the adhesive layer 8 by an attaching member (not illustrated), and passes through a recording execution region of the recording unit 3 in an attached state. Ink is attached to the support face 7 of the transporting belt 9 due to the recording operation of the recording unit 3. The cleaning unit 14 for cleaning the support face 7 on which the ink is attached is arranged in the vicinity of the drive roller 4 as described above.

The medium P is a common sheet-shaped recording medium, such as paper, fabric, or plastic film, for recording by an ink jet printer.

Device Main Body

The device main body 13 means a structure having a framework of the device as a main part, which is constituted of a plurality of frames 22.

In the recording device 1, constituent members such as the recording unit 3, the transport device 5, and the cleaning unit 14 are attached to the device main body 13 as a basic structure. Further, the recording device 1 is covered with a housing (not illustrated) to configure an appearance.

Cleaning Unit

The cleaning unit 14 includes the storage unit 18 that stores the liquid 16 for cleaning, a brush roller 20 that is half immersed in the liquid 16, and a wiping unit 2 that wipes the support face 7 of the transporting belt 9 with a wiper 11. The wiping unit 2 is supported inside the storage unit 18.

As illustrated in FIG. 1, the cleaning unit 14 is arranged in the vicinity of the drive roller 4 for the transporting belt 9. The support face 7 of the transporting belt 9 is first brush-cleaned by the rotational contact of the brush roller 20. Subsequently, when the transporting belt 9 passes through on the wiping unit 2, the support face 7 of the transporting belt 9 is wiped by the wiper 11. The liquid 16 in the storage unit 18 gradually becomes dirty due to this cleaning and wiping.

Filter Unit

As described above, the flow path members 15 and 17 are coupled to the storage unit 18. The liquid 16 in the storage unit 18 is discharged to the outside of the storage unit 18 through the one flow path member 15 that is coupled to the bottom side of the storage unit 18, and is fed to the filter unit 21. The liquid 16 is filtered by a filter 23 of the filter unit 21 and converted into a purified liquid 162, and is returned to the storage unit 18 from above through the other flow path member 17. The liquid 16 before being filtered by the filter unit 21 is referred to here as a dirty liquid 161 in contrast to the purified liquid 162.

The filter unit 21 is detachably coupled to the flow path members 15 and 17.

Figure 3:
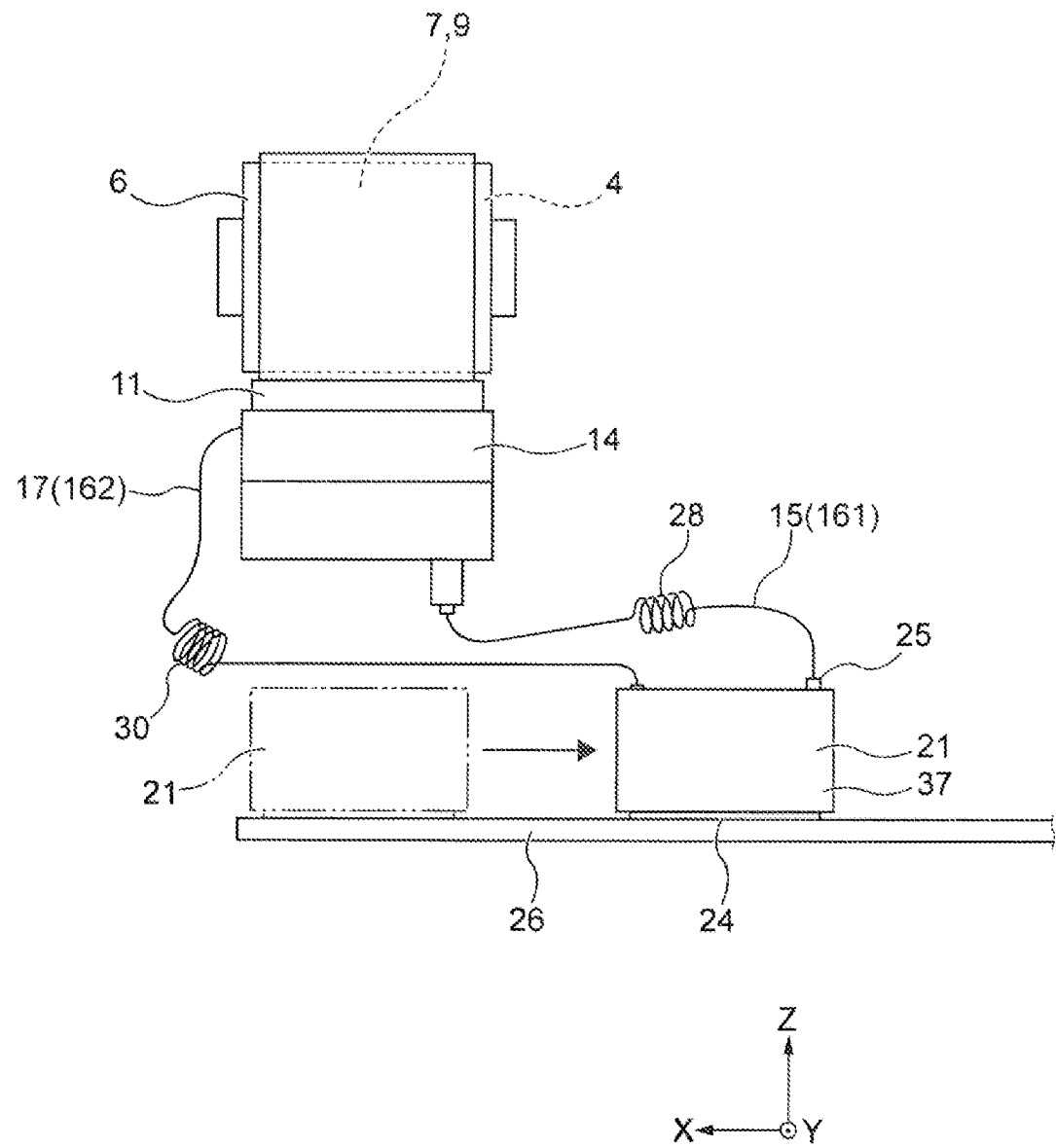
FIG. 3 is a schematic enlarged cross-sectional view of the main part of the cleaning unit according to the first exemplary embodiment as viewed from the Y-axis direction.

In addition, as illustrated in FIGS. 2 and 3, the filter unit 21 is configured to be able to be pulled out in the direction away from the device main body 13 (X-axis direction), that is, in the width direction of the transporting belt 9. In other words, the filter unit 21 is configured to be able to be pulled out in the width direction of the transporting belt 9 for the transporting belt 9.

In this embodiment, pumps 25 and 31 are provided in a liquid flow path created by the flow path members 15 and 17 to cause the liquid 16 to flow. The pumps 25 and 31 cause the liquid 16 to flow via the flow path members 15 and 17 into the storage unit 18, the filter unit 21, and again the storage unit 18. In this embodiment, two pumps 25 and 31 are provided, but the number of pumps may be one or three or more instead of two, depending on the capacity of the pumps. A supply head 27, such as a nozzle, is provided at a portion where the purified liquid 162 after filtered by the filter unit 21 is supplied from the flow path member 17 into the storage unit 18.

In this embodiment, a valve 29, such as an electromagnetic valve, is provided in the liquid flow path. The valve 29 can switch between a first state in which the flow of the liquid 16 is permitted and a second state in which the flow of the liquid 16 is restricted. Further, of the pumps 25 and 31, the pump 31 is located downstream of the valve 29 in the flow direction of the liquid 16. In this embodiment, the pump 31 is attached to the device main body 13.

As illustrated in FIG. 2, the filter unit 21 includes an accommodating unit 37 that accommodates the filter 23. The accommodating unit 37 is configured to accommodate further the valve 29 and the one pump 25. Specifically, the valve 29 and the pump 25 are respectively arranged at the upper edge portion of the accommodating unit 37.

Note that the pump 31 may also be accommodated in the accommodating unit 37 without being attached to the device main body 13. In that case, the arrangement of the valve 29 also needs to be changed so that the pump 31 is located downstream of the valve 29.

The operation of the valve 29 and the operations of the pumps 25 and 31 are controlled by the control unit 33. In this embodiment, when the filter unit 21 is pulled out from the device main body 13, the control unit 33 is configured to switch the valve 29 from the first state to the second state to restrict the flow of the liquid 16 and then stop the operation of the pump 31 located downstream of the valve 29.

Whether the filter unit 21 is pulled out from the device main body 13 is determined by providing a dedicated detection sensor (not illustrated).

As the detection sensor, for example, an optical sensor may be employed. Examples of the optical sensor include a light emitting diode (LED) as a light emitting element and a phototransistor as a photodetector. The detection sensor is fixed to the device main body 13. Specifically, in a state in which the filter unit 21 is accommodated in the device main body 13, the light emitting element is arranged so as to face the photodetector with the filter unit 21 interposed therebetween. In addition, in the state in which the filter unit 21 is accommodated in the device main body 13, the positional relationship between the filter unit 21 and the detection sensor is adjusted so that the filter unit 21 is located in the middle of the path of the light emitted from the light emitting element. At this time, the path of the light preferably intersects the moving direction of the filter unit 21. In other words, in the state in which the filter unit 21 is accommodated in the device main body 13, the light emitted from the light emitting element is blocked by the filter unit 21, whereby the light is set so as not enter the photodetector. The control unit 33 can determine that the filter unit 21 is accommodated in the device main body 13 by detecting that the light emitted from the light emitting element is blocked by the filter unit 21 by using the detection sensor. On the other hand, when the filter unit 21 is pulled out in the direction away from the device main body 13, the filter unit 21 moves out from the path of the light emitted from the light emitting element so that the light is incident on the photodetector. The control unit 33 can determine that the filter unit 21 is pulled out in the direction away from the device main body 13 due to the light emitted from the light emitting element being incident on the photodetector. Although the above description is for the case in which the detection sensor is a transmissive optical sensor, the detection sensor can be a reflective optical sensor. In a case of the reflective optical sensor, the light emitting element is provided on the same side as the photodetector. Then, based on the presence or absence of the reflected light from the filter unit 21, the control unit 33 can determine whether the filter unit 21 is pulled out from the device main body 13.

Note that the determination may be performed by switch operation by the user instead of the dedicated detection sensor. In this case, the switch is electrically coupled to the control unit 33. Alternatively, a touch panel may be provided on the recording device 1 (transport device 5), and the user may input that the filter unit 21 is pulled out in the direction away from the device main body 13 via the touch panel. In this case, the touch panel is electrically coupled to the control unit 33.

As illustrated in FIGS. 2 and 3, the filter unit 21 is provided with a pair of protruding bars 24 and 24 that are long in the pull-out direction (X-axis direction) on a bottom surface of the accommodating unit 37. The pair of protruding bars 24 and 24 are guided in a state of being fitted to a pair of rails 26 and 26, each of which has a long recessed groove. As a result, the filter unit 21 is configured to be movable in the pull-out direction.

The flow path members 15 and 17, respectively, are formed of flexible tubes and have coil portions 28 and 30, respectively, in the middle. The presence of the coil portions 28 and 30 allows the flow path members 15 and 17 to be extended and contracted. As a result, when the filter unit 21 is pulled out in the direction away from the device main body 13 (in the X-axis direction), the coil portions 28 and 30 extend, and when the filter unit 21 moves toward the device main body 13, the coil portions 28 and 30 contract.

Note that, instead of the coil portions 28 and 30, the flow path members 15 and 17 may be preset to longer lengths so that the flow path members 15 and 17 are not stretched when the filter portion 21 is pulled out.

In this embodiment, as illustrated in FIG. 2, an irradiation unit 39 that emits light is provided inside the accommodating unit 37. The irradiation unit 39 is used as illumination that brightens the coupling portions 170 between the flow path members 15 and 17 and the filter 23. As the irradiation unit 39, for example, an LED lamp or a light bulb capable of emitting visible light can be used. When the control unit 33 determines that the filter unit 21 has been pulled out from the device main body 13, the irradiation unit 39 may start emitting visible light. In other words, when the filter unit 21 is pulled out from the device main body 13, the control unit 33 may start emitting visible light by the irradiation unit 39. As a result, the power consumption of the irradiation unit 39 can be reduced.

Further, receiving units 35 and 35 capable of receiving the liquid 16 from the respective coupling portions 170 between the flow path members 15 and 17 and the filter 23 are provided. The receiving units 35 and 35 each serve as a catch pan for the leaked liquid 16, and preferably have an absorber (not illustrated) that absorbs the liquid. Furthermore, the receiving unit 35 and the absorber are preferably replaceable.

Description of Effects of First Exemplary Embodiment

Next, based on FIGS. 1 to 3, the following effects can be obtained when the filter 23 is replaced in the recording device 1 provided with the transport device 5 according to the first exemplary embodiment.

(1) According to this embodiment, as illustrated in FIG. 3, the filter unit 21 can be pulled out in the direction away from the device main body 13. As a result, by pulling out the filter unit 21 in the direction away from the device main body 13, it is possible to move the filter 23 to a position where the work for removing the filter 23 from the filter unit 21 can be easily performed. Thus, the workability of replacing the filter 23 by the user can be improved.

(2) The pumps 25 and 31 discharge the liquid 16 from the storage unit 18, and resupply the purified liquid 162, which is the liquid 16 after the liquid 16 has been filtered by the filter unit 21, to the storage unit 18. This allows the liquid 16 to be reused.

(3) When the filter unit 21 is pulled out from the device main body 13 and the filter 23 is removed from the flow path members 15 and 17, the liquid 16 that flows through the flow path members 15 and 17 may leak out.

According to this embodiment, when the control unit 33 determines that the filter unit 21 has been pulled out from the device main body 13, the control unit 33 switches the valve 29 from the first state of flow allowance to the second state of flow restriction, and then stops the operation of the pump 31 located downstream of the valve 29. In this way, the fluid 16 is first restricted from flowing the flow path members 15 and 17 by the valve 29, and then the operation of the pump 31 located downstream of the valve 29 is stopped, so that the liquid 16 remaining in the flow path members 15 and 17 can be removed, that is, the liquid can be drained. Accordingly, the risk of dirt due to liquid leakage can be reduced.

(4) The filter 23 is accommodated in the accommodating unit 37. In this way, it is possible to reduce the possibility that the filter 23 unintentionally disengages from the flow path members 15 and 17 due to the external force acting on the filter 23 when the user inadvertently touches the filter 23, for example. In other words, the filter 23 can be protected from the external force.

(5) The filter 23, the valve 29, and the pump 25 are accommodated in the accommodating unit 37. In this way, maintenance is facilitated by collecting the filter 23, the valve 29, and the pump 25 in one place.

(6) Since the irradiation unit 39 that emits light is provided inside the accommodating unit 37, the visibility when removing the filter 23 is improved.

(7) The receiving units 35 and 35 capable of receiving the liquid 16 from the coupling portions 170 of the respective flow path members 15 and 17 and the filter unit 21 are provided. As a result, when the filter 23 is removed from the flow path members 15 and 17, the liquid 16 that may leak from the coupling portions 170 is received by the respective receiving units 35 and 35, so that it is possible to suppress that the surroundings become dirty.

Other Embodiments

The recording device 1 including the transport device 5 according to the exemplary embodiment of the present disclosure is based on the configuration described above. However, as a matter of course, partial configurations may be modified or omitted without departing from the gist of the disclosure of the present application.

For example, a detection unit that detects the level of dirt of the filter 23 may be provided.

The detection sensor may not be an optical sensor. The detection sensor may be an ultrasonic sensor or a mechanical sensor such as a microswitch.

What is claimed is:

1. Transport device comprising:
a transporting belt having a support face configured to support a medium and configured to transport the medium;
a device main body in which the transporting belt is provided; and
a cleaning unit configured to clean the support face with a liquid, wherein the cleaning unit includes
a storage unit in which the liquid is stored,
a flow path member through which the liquid discharged from the storage unit and returned to the storage unit passes, and
a filter unit including a filter detachably coupled to the flow path member and an accommodating unit configured to accommodate the filter,
the filter unit is configured to be pulled out in a direction away from the device main body, and
the transport device further comprises an irradiation unit configured to emit light inside the accommodating unit.

2. The transport device according to claim 1, comprising a pump configured to cause the liquid to flow to the storage unit, the filter unit, and the storage unit again, via the flow path member.

3. The transport device according to claim 2, comprising:
a valve configured to switch between a first state in which the flow of the liquid is permitted and a second state in which the flow of the liquid is restricted;
the pump located downstream of the valve in a flow direction of the liquid, the number of the pump being one or more; and
a control unit configured to control the valve and the pump, wherein
the control unit, when the filter unit is pulled out from the device main body, switches the valve from the first state to the second state and then stops operation of the pump located downstream of the valve.

4. The transport device according to claim 1, wherein the accommodating unit accommodates the valve and the pump.

5. The transport device according to claim 1, comprising a receiving unit configured to receive the liquid from a coupling portion between the flow path member and the filter.

6. A recording device comprising:
   a recording unit configured to perform recording on a medium;
   a transporting belt having a support face configured to support the medium and configured to transport the medium;
   a device main body in which the transporting belt is provided; and
   a cleaning unit configured to clean the support face with a liquid, wherein
   the cleaning unit includes
   a storage unit in which the liquid is stored, a flow path member through which the liquid discharged from the storage unit and returned to the storage unit passes, and
   a filter unit detachably provided to the flow path member and an accommodating unit configured to accommodate the filter,
   the filter unit is configured to be pulled out in a direction away from the device main body, and
   the recording device further comprises an irradiation unit configured to emit light inside the accommodating unit.

* * * * *